United States Patent [19]

Warner

[11] 4,043,212
[45] Aug. 23, 1977

[54] VARIABLE DRIVE

[75] Inventor: John Craig Warner, Ithaca, N.Y.

[73] Assignee: Borg-Warner Corporation, Chicago, Ill.

[21] Appl. No.: 666,387

[22] Filed: Mar. 12, 1976

[51] Int. Cl.² ........................ F16H 55/49; F16H 55/56
[52] U.S. Cl. .............................. 74/230.17 A; 74/230.5
[58] Field of Search ............... 74/230.17 A, 230.17 B, 74/230.17 C, 230.17 R, 230.16, 230.5, 230.8, 217 R

[56] References Cited

U.S. PATENT DOCUMENTS

| 3,108,484 | 10/1963 | Rabinow | 74/230.17 C |
| 3,604,282 | 10/1969 | Shambaugh | 74/230.17 C |

Primary Examiner—Samuel Scott
Assistant Examiner—Allan R. Burke
Attorney, Agent, or Firm—Aubrey L. Burgess

[57] ABSTRACT

A variable pulley system incorporating driver and driven pulleys in which a flange of the driver pulley has a rim to receive the belt or the like connecting the pulleys in the final drive ratio of the pulleys.

5 Claims, 2 Drawing Figures

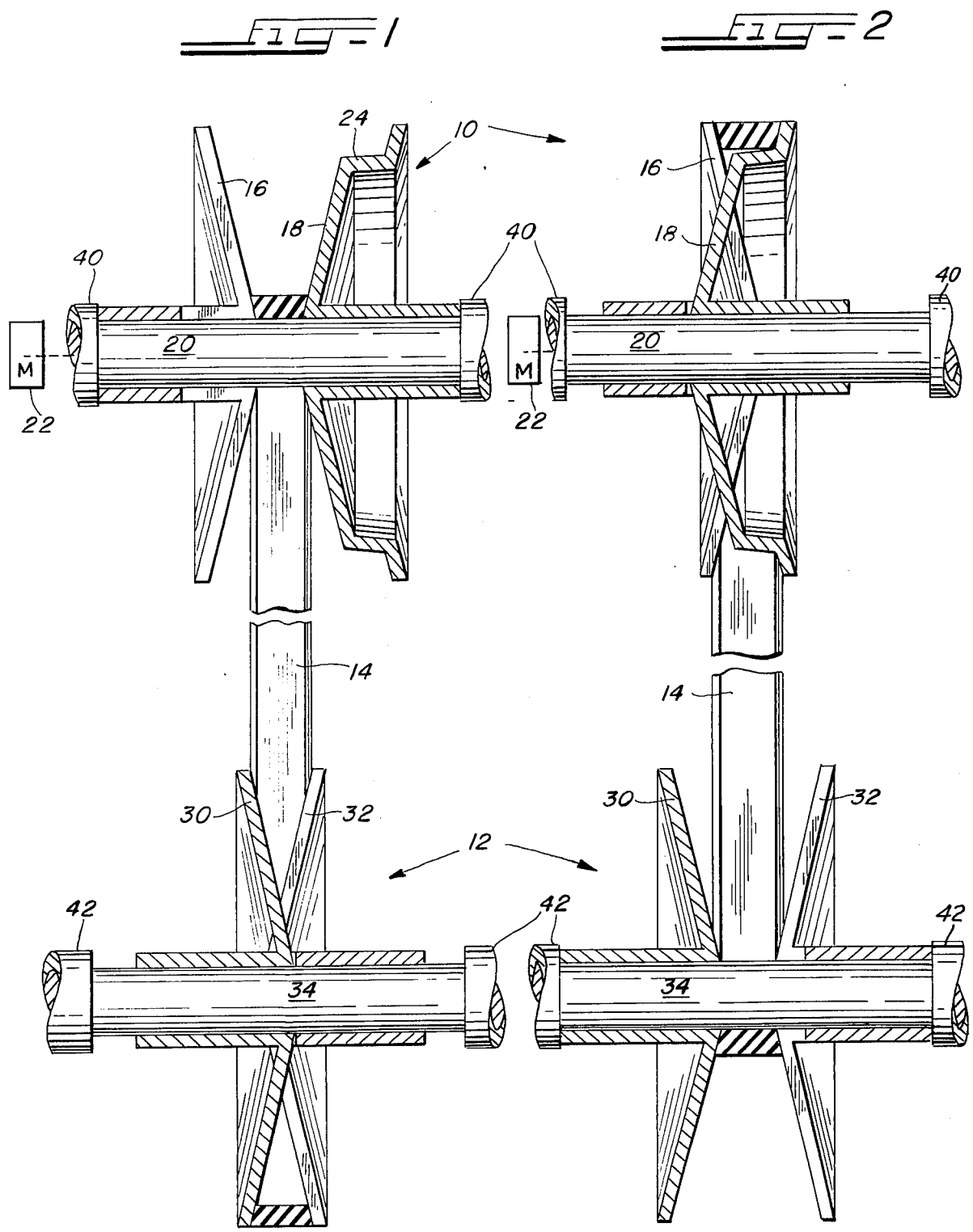

VARIABLE DRIVE

BACKGROUND OF THE INVENTION

Variable pulley drive systems comprise a driveR and a driveN pulley, each of which is constructed of a pair of pulley flanges. At least one of the pair of pulley flanges is movable relative to the other. A belt, chain or the like connects the two pulleys. The driveR pulley is constructed so that the spacing between the flanges is changed by centrifuged force, hydraulic force, mechanical force or a combination thereof, which through the drive belt or chain causes corresponding changes in the spacing between the flanges of the driveN pulley.

Generally the flanges of the pulleys are linear, i.e., without steps and the like, so that an infinite number of speed changes can be provided throughout the operating range of the system. In some variable pulley drive systems, the pulley flanges are slotted, so that the flanges intermesh with one another during operation.

THE INVENTION

According to this invention, there is provided a variable pulley drive system comprising a driveR pulley and a driveN pulley connected by a belt, chain and the like. Each pulley is formed of a pair of flanges, at least one of which is movable relative to the other. The flanges of each pulley are slotted, so that they intermesh with one another, and the driveR pulley is provided with at least one axially extending rim or ledge to receive the belt or chain when the drive ratio is such that the belt or chain is at the radial position of the rim. At this location and under the conditions of operation, the drive is of a fixed ratio.

The drive of this invention is particularly adapted for a drive system having a motor with low starting torque because it can eliminate the need for starting equipment; thus, the installation is less expensive and is adaptable to a system with start and stop operations.

THE DRAWINGS

FIG. 1 is a schematic sectional view of a variable pulley drive constructed according to the invention in starting position; and FIG. 2 is a schematic sectional view of a variable pulley drive system according to this invention in belt-rim engaging position.

DETAILED DESCRIPTION

FIGS. 1 and 2 illustrate a typical variable pulley drive system constructed in accordance with this invention. FIG. 1 shows the pulleys in their initial and rest position, while FIG. 2 shows the pulleys in their final drive positions. The driveR pulley is identified as 10 while the driveN pulley is identified as 12. The pulleys are, in the illustrated embodiment, connected by a drive belt 14, which can, if desired, be replaced with a chain and the like.

The driveR pulley 10 comprises a pair of flanges 16 and 18 connected for rotation with an axial movement relative to a shaft 20 driven by a prime mover, such as a motor 22. Keys and keyways may be used, as is required, to drivingly connect the shaft to the flanges while permitting the axial movement of the flanges. The flanges 16 and 18 are caused to move axially more on the shaft 20 from the initial positions of FIG. 1 to the positions of FIG. 2. Means to accomplish such movement may be mechanical, hydraulic or a combination thereof; the flanges can be energized by centrifugal force. Many structures for providing such movement are well known in the art. In that the particular means do not form a part of the invention herein, they are not illustrated.

The driver pulley 10 is constructed with a substantially cylindrical rim 24 which may be slightly sloped or angled toward the operating flange surfaces, as illustrated, for a purpose to be described.

The driveN pulley 12 comprises a pair of flanges 30 and 32 connected to a shaft 34, so as to drive the shaft and also be axially movable relative thereto. Keys and keyways in the hubs may be used, as required, to provide the driving connection between the flanges and the shaft. The flanges 30 and 32 are resiliently urged toward one another by means such as springs or the like not shown, which means are common in the art.

As will be noted in the drawings, the flanges 16, 18 and 30, 32 are slotted, so that the flanges of a pulley intermesh with one another. This is necessary for shifting to the drive in which the belt 14 is on the rim 24 of the flange 18 to achieve the final drive ratio. Stop means, such as collars and the like 40, 40, 42, 42 mounted on the shafts 20 and 34 limit the axial movement of the flanges on the shafts.

In operation, the pulleys are in their positions; upon rotation of the shaft 20, and as the rim of the shaft 20 increases, the flanges of the driveR pulley 16 and 18 move toward one another. This has the effect of shortening the belt with respect to the driveN pulley, so that the flanges 30, 32 move outwardly and away from each other permitting the belt 14 to ride closer to the shaft 34; the rpm of the shaft 34 will be thus increased accordingly. When the belt moves past the terminus of the flange 18, it will be received on the rim 24 of the flange 18, providing the final drive ratio between the driveR and driveN pulleys. When it is desired to reverse the speed ratios, the slope of the rim 24 will cause the belt to slide toward the flange 16 when the flange 16 is moved away from the flange 18, and the belt will then contact the flanges 16 and 18 and eventually reach its FIG. 1 position. At this time, the pulleys 30 and 32, being resiliently urged toward one another, will move to their FIG. 1 position.

As stated, the means for causing axial movement of the driveR pulley flanges upon rotation of the driveR shaft may be hydraulic, pneumatic or mechanical. Also, the means for resiliently urging the driveN pulley flanges axially toward each other generally comprise coil springs or the like. In that such means are well known in the art and do not form a part of the invention herein, they are not illustrated. However, examples of such means are found in the U.S. Pats. to Taylor, No. 3,599,504, Stever, No. 3,190,136 and McIntyre, No. 534,448. These means can be adapted for the drive of this invention by one skilled in the art.

I claim:

1. A variable drive system comprising driveR and driveN pulleys, each connected to a shaft, means connecting the pulleys, each pulley comprising a pair of flanges, the flanges of each pulley being axially movable toward and away from each other and relative to its respective shaft, one flange of one of said pulleys having an axially extending flat-surfaced outer rim to receive said pulley connecting means in the final drive ratios between said pulleys.

2. A variable drive system as in claim 1 in which said rim is on a flange of said driveR pulley.

3. A variable drive system as in claim 1 in which said rim is sloped, so as to assist the disengagement of the connecting means therefrom.

4. A variable drive system comprising:
a driveR shaft
a driveN shaft;
a driveR variable pulley connected for rotation with said driveR shaft;
a driveN variable pulley connected for rotation with said driveN shaft;
a belt connecting said pulleys, each pulley having a pair of flanges with at least one flange axially movable with respect to its shaft;
said driveR pulley having one of its flanges with a generally cylindrical flat-surfaced outer rim thereon to receive said belt at final drive ratio between said pulleys.

5. A variable drive system as recited in claim 4 in which said rim is sloped so as to assist the disengagement of said belt therefrom.